(12) United States Patent
Wybenga et al.

(10) Patent No.: US 7,564,841 B2
(45) Date of Patent: Jul. 21, 2009

(54) APPARATUS AND METHOD FOR PERFORMING FORWARDING TABLE SEARCHES USING CONSECUTIVE SYMBOLS TABLES

(75) Inventors: Jack C. Wybenga, Plano, TX (US);
Patrick W. Ireland, Sanger, TX (US);
Patricia Kay Sturm, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 887 days.

(21) Appl. No.: 10/826,158

(22) Filed: Apr. 16, 2004

(65) Prior Publication Data

US 2005/0195812 A1    Sep. 8, 2005

Related U.S. Application Data

(63) Continuation-in-part of application No. 10/794,506, filed on Mar. 5, 2004, now Pat. No. 7,440,460.

(51) Int. Cl.
*H04L 12/56* (2006.01)
*H04L 12/28* (2006.01)
(52) U.S. Cl. ................... 370/389; 370/392; 709/238
(58) Field of Classification Search .............. None
See application file for complete search history.

(56) References Cited

U.S. PATENT DOCUMENTS

| | | | |
|---|---|---|---|
| 6,192,051 B1* | 2/2001 | Lipman et al. | 370/389 |
| 6,496,510 B1* | 12/2002 | Tsukakoshi et al. | 370/401 |
| 6,697,363 B1* | 2/2004 | Carr | 370/389 |
| 7,249,149 B1* | 7/2007 | Eatherton et al. | 707/104.1 |
| 2004/0111440 A1* | 6/2004 | Richardson et al. | 707/200 |
| 2004/0114587 A1* | 6/2004 | Huang et al. | 370/389 |
| 2004/0264479 A1* | 12/2004 | Raghunandan | 370/400 |

* cited by examiner

*Primary Examiner*—Hong Cho
*Assistant Examiner*—Robert C Scheibel

(57) ABSTRACT

A routing table search circuit for determining a first destination address for a first received data packet. The routing table search circuit comprises: i) a forwarding table containing destination addresses; and ii) a trie tree search table for translating an address portion of the first received data packet into a destination pointer for accessing the first destination address in the forwarding table. A first stage of the trie tree search table is searched using a received address pointer from a previous stage of the trie tree search table and a first m-bit symbol of the address portion. The routing table search circuit also comprises at least one consecutive symbols table and a control circuit for determining that a second consecutive m-bit symbol is the same as the first m-bit symbol. The control circuit then determines a total number of consecutive identical m-bit symbols beginning with the first m-bit symbol.

24 Claims, 8 Drawing Sheets

APPARATUS AND METHOD FOR PERFORMING FORWARDING TABLE SEARCHES USING CONSECUTIVE SYMBOLS TABLES

CROSS-REFERENCE TO RELATED APPLICATIONS

The present invention is a continuation-in-part of U.S. patent application Ser. No. 10/794,506, filed on Mar. 5, 2004, now U.S. Pat. No. 7,440,460 application Ser. No. 10/794,506 is assigned to the assignee of the present application. The subject matter disclosed in patent application Ser. No. 10/794,506 is hereby incorporated by reference into the present disclosure as if fully set forth herein.

TECHNICAL FIELD OF THE INVENTION

The invention relates to massively parallel routers and, more specifically, to an apparatus and method for forwarding mixed data packet types (e.g., IPv4, IPv6) at high-speed line rates in a massively parallel, distributed architecture router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

When a data packet arrives in a conventional routing node, a forwarding engine in the routing node uses forwarding tables to determine the destination of the data packet. A conventional Internet Protocol (IP) router uses a dedicated forwarding table for each type of traffic, such as Internet Protocol version 4 (IPv4), Internet Protocol version 6 (IPv6) and MPLS.

However, conventional routing tables have severe limitations. Using separate forwarding engines and forwarding processes with independent forwarding tables for each packet type is inefficient in terms of computing resources and memory utilization. It is desirable to eliminate separate lookup tables for each type of traffic, so that a single lookup (i.e., forwarding) table may forward mixed data packet types. Moreover, conventional routing tables are best suited for relatively lower speed routers (i.e., 100 Mbps or less) and for relatively small address sizes (i.e., 32 bits or less). It also is desirable to allow packet forwarding based on class of service (CoS) and/or higher layer protocols.

Performing an IPv6 forwarding table lookup at high-speed line rates (e.g., 10 Gbps) is a challenge because of the large address range (128-bit addresses). There currently is not a practical method for doing IPv6 lookups at line speed for high-speed interfaces (e.g., 10 Gbps routers). Current proposals use ternary content addressable memory (TCAM) devices to increase lookup speed, but doing the entire search in TCAM is not practical due to the expense and high power consumption of TCAM devices. Also, hashing and state of the art searching techniques are not adequate because it is necessary 1) to keep tables within a reasonable size limit for cost and performance considerations and 2) to keep the number of lookup stages low enough that memory access time does not prevent the lookup speeds from keeping up with line speeds.

The assignee of the present application has submitted three related patent applications directed to solving some of these problems. These three applications are: 1) U.S. patent application Ser. No. 10/431,770, entitled "Apparatus and Method for Combining Forwarding Tables in a Distributed Architecture Router," filed on May 8, 2003, and currently pending; 2) U.S. patent application Ser. No. 10/665,192, entitled "Apparatus and Method for Classifying Traffic in a Distributed Architecture Router," filed on Sep. 4, 2003, now U.S. Pat. No. 6,940,981; and 3) U.S. patent application Ser. No. 10/658,977, entitled "Apparatus and Method for Performing High-Speed Lookups in a Routing Table," filed on Sep. 10, 2003, and currently pending; U.S. patent application Ser. Nos. 10/431,770, 10/665,192 and 10/658,977 are hereby incorporated by reference into the present application.

Each of these solves some of the problems of large forwarding table indices and large numbers of routes. U.S. patent application Ser. Nos. 10/431,770 and 10/665,192 are suitable for use in 1 Gbps routers and provide an adequate solution for line rates up to 1 Gbps. U.S. patent application Ser. No. 10/658,977 provides a solution for line rates up to 10 Gbps. The present application expands upon the ideas in U.S. patent application Ser. Nos. 10/431,770, 10/665,192 and 10/658,977.

U.S. patent application Ser. No. 10/431,770 solved the problems of dealing with three large tables and of the complexity of dealing with three separate forwarding tables for IPv4, IPv6, and Multiprotocol Label Switching (MPLS) by folding these into a single forwarding table. U.S. patent application Ser. No. 10/431,770 disclosed the use of address space sharing between IPv4 and MPLS and the tunneling of IPv6 data packets. A classification engine based on state graph technology was used to compress the IPv6 address into the address to be tunneled and a CAM was used to speed the lookup. The approach disclosed in U.S. patent application Ser. No. 10/431,770 differs from traditional uses of CAMs in that the classification engine allowed the fields in the lookup index to vary on a packet-by-packet basis determined by packet contents, instead of using fixed bit fields. However, the method disclosed in U.S. patent application Ser. No. 10/431,770 is less suitable for use in a 10 Gbps router, because classification engines are not available that operate at the 10 Gbps line rate.

U.S. patent application Ser. No. 10/665,192 extended the use of the classification engine to add new functionality to routers. U.S. patent application Ser. No. 10/665,192 disclosed the modification of the data packet in the forwarding process, thereby enabling the new functionality. The new functionality included: 1) providing security in the form of user anonymity by translating Layer 2 and Layer 3 addresses in the classification engine; 2) providing support for Network Address Translation (leading to configuration independence); and 3) enabling forwarding based on Layer 2 through Layer 7 information, instead of Layer 3 forwarding only. U.S. patent application Ser. No. 10/665,192 also provided support for content-based billing, firewall functionality, and data surveillance capabilities at the router core instead of at a host computer.

U.S. patent application Ser. No. 10/658,977 disclosed a new apparatus and method for forwarding IPv6 data packets at high-speed line rates (e.g., 10 Gbps). U.S. patent application Ser. No. 10/658,977 abandoned the use of classification engines because conventional classification engines cannot operate at 10 Gbps. U.S. patent application Ser. No. 10/658,977 expanded on the prior art by compacting the search tables to fit within practical SRAM sizes while allowing the final lookup stage to use DRAM, by combining the compacted search tables with pipelined hardware lookup support, and by including an initial CAM-based hashing technique into multiple trie trees to narrow the lookup width in the trie search.

However, the apparatus and method disclosed in U.S. patent application Ser. No. 10/658,977 are suitable for homogeneous packet types where the important fields do not change from packet to packet, but are less suitable for mixed data packet types, where the important fields change from packet to packet. The nature of the pipelining is such that each stage of the pipeline acts upon every packet. If a packet does not need the processing of a pipeline stage, then the resources of that pipeline stage are idle when the packet traverses that stage.

Therefore, there is a need in the art for an improved router that does not suffer from the above-described problems associated with the prior art. In particular, there is a need for a distributed router that is capable of forwarding mixed types of data packets at high-speed lines rates, such as 1 gigabits per second (Gbps) and higher. More particularly, there is a need for a distributed router that forwards mixed data packets at high line rates without using large amounts of content addressable memory (CAM). Still more particularly, there is a need for a distributed router that forwards mixed data packets at high line rates without using classification engines.

SUMMARY OF THE INVENTION

To address the above-discussed deficiencies of the prior art, it is a primary object of the present invention to provide, for use in a router, a routing table search circuit for determining a first destination address for a first received data packet. According to an advantageous embodiment of the present invention, the routing table search circuit comprises: i) a forwarding table comprising a plurality of forwarding table entries, each of the forwarding table entries comprising a destination address; ii) a trie tree search table for translating an address portion of an address associated with the first received data packet into a destination pointer for accessing the first destination address in the forwarding table, wherein a first stage of the trie tree search table is searched using a received address pointer retrieved from a previous stage of the trie tree search table and a first m-bit symbol comprising m bits of the address portion; iii) at least one consecutive symbols table associated with the first stage of the trie tree search table; and iv) a control circuit capable of determining that a second m-bit symbol immediately following the first m-bit symbol is the same as the first m-bit symbol, wherein the control circuit, in response to the determination, determines a total number of consecutive identical m-bit symbols beginning with the first m-bit symbol.

According to one embodiment of the present invention, the control circuit retrieves from the at least one consecutive symbols table a first address pointer determined by the total number of consecutive m-bit symbols.

According to another embodiment of the present invention, the first address pointer comprises the destination pointer.

According to still another embodiment of the present invention, the first address pointer is used to search a subsequent stage of the trie tree search table.

According to a further embodiment of the present invention, the at least one consecutive symbols table comprises a plurality of consecutive symbols tables and the control circuit uses a value of the first m-bit symbol to select a first one of the plurality of consecutive symbols tables.

According to a still further embodiment of the present invention, the routing table search circuit further comprises an intermediate table for storing a plurality of consecutive symbols tables pointers, each of the consecutive symbols tables pointers associated with one of the plurality of consecutive symbols tables.

According to a yet further embodiment of the present invention, the control circuit uses the value of the first m-bit symbol to retrieve a first one of the consecutive symbols tables pointers from the intermediate table.

According to another embodiment of the present invention, the control circuit uses the retrieved first consecutive symbols tables pointer to select the first consecutive symbols table.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed packet switch or router.

Figure 1:
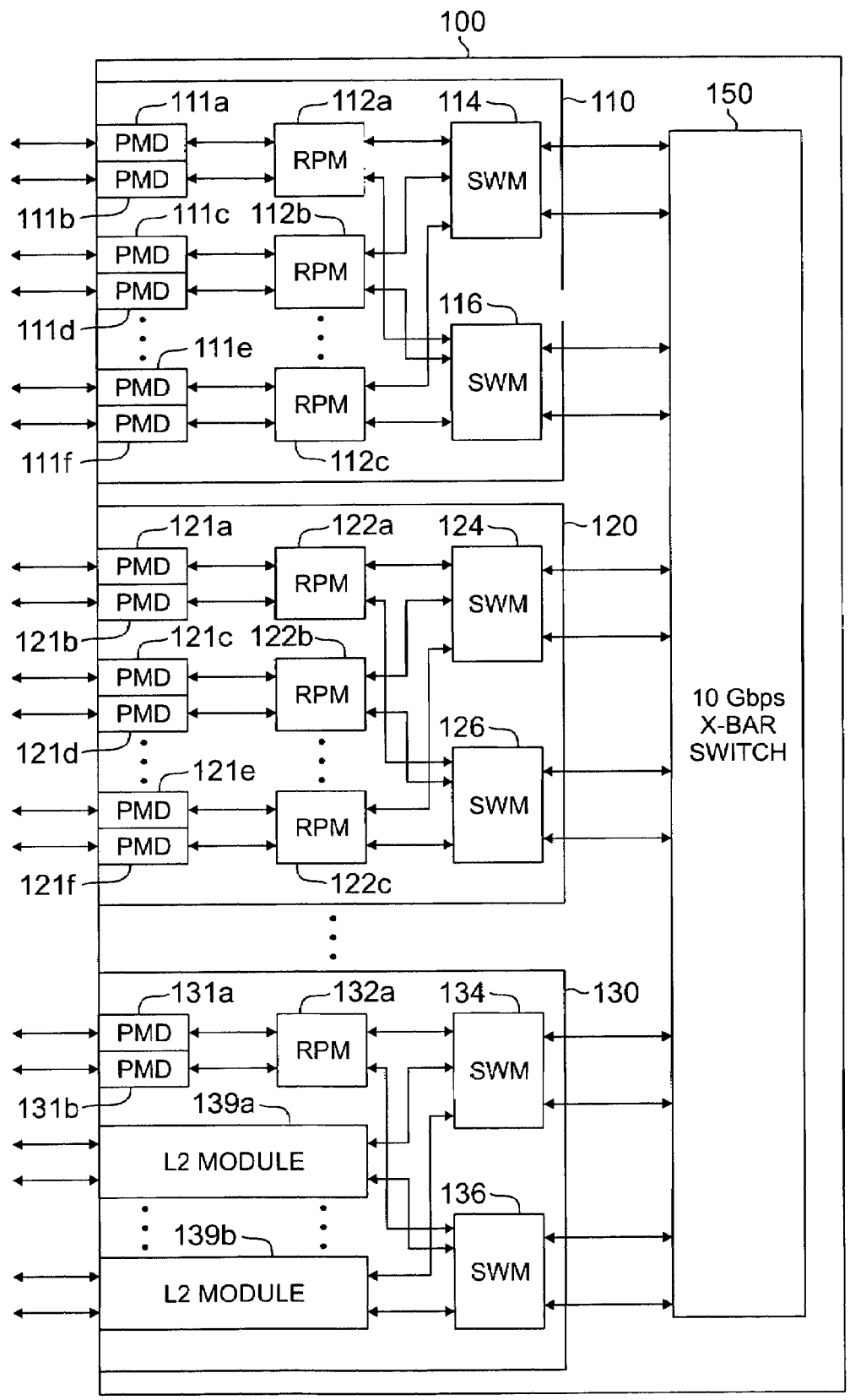
FIG. 1 illustrates a distributed architecture router that forwards mixed data packet types at high-speed line rates according to the principles of the present invention.

FIG. 1 illustrates exemplary distributed architecture switch (or router) 100 (hereafter, simply "router 100"), which forwards mixed data packet types (e.g., IPv4, IPv6) at high-speed line rates (e.g., 10 gigabits per second) according to the principles of the present invention. According to the exemplary embodiment, router 100 comprises N rack-mounted shelves, including exemplary shelves 110, 120, and 130, that are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 will comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route processing module (i.e., RPM 112a). The data packet still must be forwarded to RPM 112a, but does not need to be forwarded to crossbar switch 150 or to switch modules 114 and 116.

According to the principles of the present invention, the route processing modules and the L2 modules in router 100 use forwarding tables (or routing tables) to forward incoming data packets towards their destinations. The present invention accomplishes this by means of a multi-stage routing table that combines a first stage content addressable memory (CAM) and pipelined stages of trie tree lookup tables to forward mixed packet types at high-speed line rates.

Figure 2:
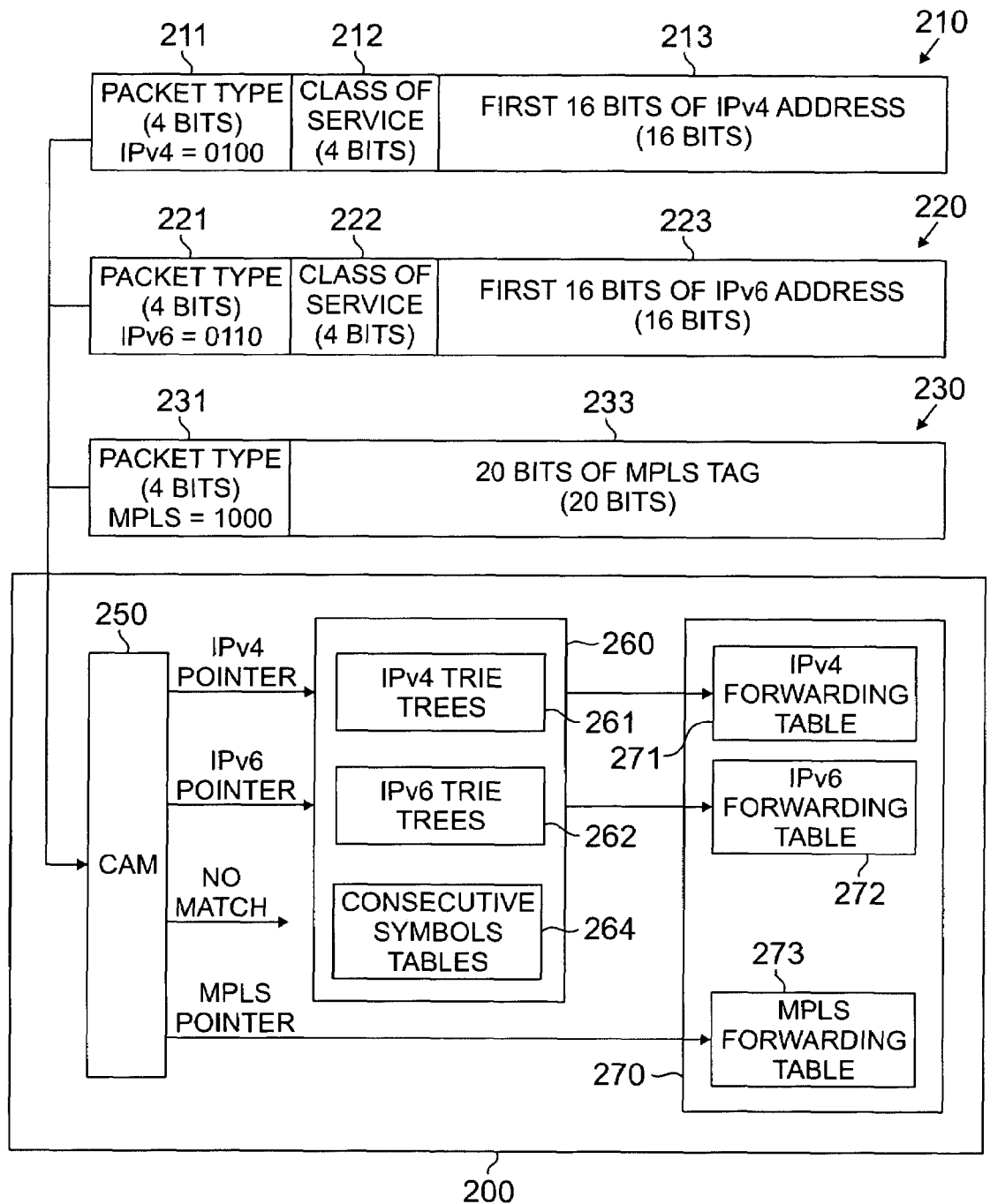
FIG. 2 illustrates selected portions of a routing table search circuit in greater detail according to an exemplary embodiment of the present invention.

FIG. 2 illustrates selected portions of routing table search circuit 200 in greater detail according to an exemplary embodiment of the present invention. A routing table search circuit similar to routing table search circuit 200 is associated with each of the route processing modules in the N shelves of router 100. Routing table search circuit 200 comprises content addressable memory (CAM) 250, pipelined trie tree lookup tables 260, and forwarding tables 270.

Pipelined trie tree lookup tables 260 comprise IPv4 trie tree lookup tables 261, IPv6 trie tree lookup tables 262, and consecutive symbols tables 264. Lookup tables 261 and 262 and consecutive symbols tables 264 represent logical tables, rather than distinct hardware devices. In reality, IPv4 trie tree lookup tables 261, IPv6 trie tree lookup tables 262, and consecutive symbols tables 264 may be part of the same memory structure.

In a similar manner, forwarding tables 270 comprise IPv4 forwarding table 271, IPv6 forwarding table 272, and MPLS forwarding table 273. IPv4 forwarding table 271, IPv6 forwarding table 272, and MPLS forwarding table 273 represent logical tables, rather than distinct hardware devices. In reality, IPv4 forwarding table 271, IPv6 forwarding table 272, and MPLS forwarding table 273 are distinct groups of table entries in forwarding tables 270.

According to an advantageous embodiment of the present invention, pipelined trie tree lookup tables 260 and forwarding tables 270 may be implemented in a multi-threaded, parallel processing architecture. Alternatively, the trie tree lookup process may be implemented in the same manner as the trie-based pipelined routing table disclosed in U.S. patent application Ser. No. 10/658,977. Thus, in an exemplary embodiment, pipelined trie tree lookup tables 260 comprise a series of pipelined SRAM stages that output address pointers to subsequent SRAM stages and to forwarding tables 270. The inputs to each SRAM stage are, for example, 4 bits of the data packet address and an address pointer from a previous SRAM stage.

Also, in the exemplary embodiment, forwarding tables 270 comprise DRAM devices containing a plurality of route table entries. The route table entries are indexed by the address pointers output from pipelined trie tree lookup tables 260. Each route table entry may comprise, for example an Output port, a Destination MAC address, a Destination IP address, an IP mask, the Next Hop Gateway, and the like.

The present invention performs a space-folding algorithm that uses CAM 250 to find either 1) a routing table entry in forwarding table 270, or 2) a starting point in IPv4 trie tree lookup tables 261 or in IPv6 trie tree lookup tables 262. Trie tree lookup tables 261 and 262 then complete the search.

The different protocol types (IPv4, IPv6, MPLS) have different length routing addresses. An IPv4 address is 32 bits long, an IPv6 address is 128 bits long, and an MPLS address is 20 bits long. The first step in the address resolution process is to build a search key from the address bits and other information in the data packet header to use as the CAM lookup index. The index may be any size. However, in an exemplary embodiment of the present invention, a 24-bit search key is used.

The search key is composed of fields that separate the address space by packet type and Class of Service (CoS) and of address fields that contain part or all of the routing address. According to an exemplary embodiment, the first nibble (i.e., 4 bits) of the key is a Packet Type field that indicates the type of address resolution to perform (i.e., IPv4, IPv6, or MPLS).

By way of example, it is assumed that the Packet Type field for MPLS is set to 8 (1000 binary), the Packet Type field for IPv4 is set to 4 (0100 binary), and the Packet Type field for IPv6 is set to 6 (0110 binary).

FIG. 2 illustrates exemplary IPv4 search key 210, exemplary IPv6 search key 220, and exemplary MPLS search key 230. Each of search keys 210, 220 and 230 comprises 24 bits. IPv4 search key 210 comprises Packet Type field 211 (4 bits), Class of Service (CoS) field 212 (4 bits), and address field 213 (16 bits). IPv6 search key 220 comprises Packet Type field 221 (4 bits), Class of Service (CoS) field 222 (4 bits), and address field 223 (16 bits). MPLS search key 230 comprises Packet Type field 231 (4 bits) and address field 233 (20 bits).

For an MPLS data packet, address field 233 immediately follows Packet Type field 231 and contains the entire 20-bit MPLS tag. For IPv4 and IPv6, the first 2 bytes (16 bits) of the routing address are used as the lower 16 bits of the search key. This leaves 4 bits. These remaining 4 bits (i.e., CoS fields 212 and 222) are available for other purposes. In an advantageous embodiment of the present invention, these four bits are used for routing IPv4 and IPv6 packets based on Class of Service (CoS). If CoS based routing is not desired, CoS fields 212 and 222 may be set to a default value (e.g., 0000).

As noted above, the 24-bit search keys 210, 220 and 230 are used for an initial (i.e., first stage) lookup operation in CAM 250. This lookup could be done as a normal table lookup, but CAM 250 is used to improve efficiency. For IPv4 and IPv6 data packets, the result of the initial lookup (i.e., the output of CAM 250) gives the starting point for a search of trie tree lookup tables 260 that uses the rest of the IPv4 or IPv6 address bits to find the correct entry in forwarding tables 270.

For MPLS data packets, all of the address bits are used to search in CAM 250, so the result of the initial search directly gives the correct entry in forwarding tables 270. However, in an alternate embodiment, where less than all of the MPLS address bits are used to search CAM 250, the output of CAM 250 plus the remaining MPLS address bits may be used to search trie tree lookup tables 260 to find the correct entry in forwarding tables 270.

The address resolution value may be found by direct index referenced into an array of $2^{24}$ (16,777,216) address resolution references, instead of through the CAM lookup. If the address points into a 32 bit address space, then the direct reference array would require $2^{26}$ (67,108,864) bytes of memory. This is a large amount of memory, especially considering that the memory is expensive, high-speed memory with severe board layout constraints.

The initial address resolution table also must be able to distinguish between valid address resolution values and those entries that do not indicate a valid search key. Normally, a special value either null (zeros) or −1 (all bits set) in the corresponding address resolution table is used to indicate an irresolvable address reference (i.e., "No Match"). Using CAM 250 in the initial search stage significantly reduces the memory requirements from the direct reference approach. In addition, CAM 250 has the ability to indicate an irresolvable entry without the need to initialize each element. This simplifies and speeds up system initialization.

As will be explained below in greater detail, search trie tree lookup tables 260 are searched using the output of CAM 250 and the remaining bits the IPv4, IPv6, or MPLS address. The remaining bits of the IPv4, IPv6, or MPLS address are used m bits at a time in each trie tree stage in lookup tables 260. In an advantageous embodiment, m=4, so that 4-bit symbols are consumed in each trie tree stage. For example, a microengine in a route processing module (RPM) uses the address pointer from CAM 250 and the first 4-bit symbol from the remaining 112 bits of an IPv6 address to retrieve a result from the first trie tree stage of IPv6 trie tree lookup tables 262. The retrieved result is either an entry in forwarding tables 270 (i.e., a leaf) or an address pointer into the second stage of IPv6 trie tree lookup tables 262 (i.e., a branch).

If the result is an address pointer into the second trie tree stage, the microengine uses the address pointer and the second 4-bit symbol from the remaining 112 bits of the IPv6 address to retrieve a result from the second trie tree stage of IPv6 trie tree lookup tables 262. The second retrieved result is either an entry in forwarding tables 270 (i.e., a leaf) or an address pointer into the third stage of IPv6 trie tree lookup tables 262 (i.e., a branch). In a worst-case scenario, the microengine may repeat this process until all 112 remaining IPv6 address bits (28 symbols) are consumed.

According to an advantageous embodiment of the present invention, consecutive symbols tables 264 may be implemented in order to increase the search speed of lookup tables 261 and 262. Frequently, a long address, such as an IPv6 address, may contain a sequence of repeating bit patterns (or symbols). By way of example, an IPv6 address may contain a large number of consecutive binary 0 values or consecutive binary 1 values. These repeating bit patterns (or consecutive symbols) may be detected and skipped in order to increase the search speeds of lookup tables 261 and 262.

Consider an example in which address bits are grouped into 4-bit symbols represented by hexadecimal values. It is noted that 4-bit symbols are used by way of example only. Symbol sizes greater than 4 bits and less than 4 bits may also be used. After CAM 250 consumes the first 16 bits of an IPv6 address, the remaining 112 bits (28 symbols) of the IPv6 address may contain the sequence [ . . . F5C2222256A . . . 4D34]. The five consecutive hexadecimal 2 values represent five consecutive occurrences of the 4-bit symbol 0010.

According to the principles of the present invention, each microengine in the network data processors of the route processing modules (RPMs) of router 100 is able to detect consecutive symbols in the IPv4, IPv6 and/or MPLS addresses that are applied to trie tree lookup tables 260. At the trie tree stage where the consecutive symbols begin, the microengine breaks out of the trie tree lookup operation and retrieves from consecutive symbols tables 264 a result corresponding to the number of consecutive symbols that occurred. Assuming a valid address, the retrieved result from consecutive symbols tables 264 is either 1) a routing table entry in forwarding table 270; or 2) an address pointer indexing into another stage in lookup tables 261 or lookup tables 262.

According to an exemplary embodiment of the present invention, at least one consecutive symbols table may be associated with each stage of trie tree lookup tables 260. By way of example, a first Consecutive 0 Symbols table may be associated with the first stage of IPv6 trie tree lookup tables 262. The first Consecutive 0 Symbols table is searched whenever a string of consecutive 4-bit symbols equal to 0000 is detected that begins with the 4-bit symbol used to search the first stage of IPv6 trie tree lookup tables 262.

The first Consecutive 0 Symbols table contains a result (i.e., FT 270 entry or address pointer) that corresponds to the number of consecutive symbols detected. Thus, the first result in the first Consecutive 0 Symbols table corresponds to two consecutive 0 symbols (0 and 1 consecutive symbols do not exist in the consecutive symbols table), the second result in the first Consecutive 0 Symbols table corresponds to three consecutive 0 symbols, the third result in the first Consecutive 0 Symbols table corresponds to four consecutive 0 symbols, and so forth.

Similarly, a second Consecutive 0 Symbols table may be associated with the second stage of IPv6 trie tree lookup tables 262. The second Consecutive 0 Symbols table is searched whenever a string of consecutive 4-bit symbols equal to 0000 is detected that begins with the 4-bit symbol used to search the second stage of IPv6 trie tree lookup tables 262.

The second Consecutive 0 Symbols table contains a result (i.e., FT 270 entry or address pointer) that corresponds to the number of consecutive symbols detected. Thus, the first result in the second Consecutive 0 Symbols table corresponds to two consecutive 0 symbols (0 and 1 consecutive symbols do not exist), the second result in the second Consecutive 0 Symbols table corresponds to three consecutive 0 symbols, the third result in the second Consecutive 0 Symbols table corresponds to four consecutive 0 symbols, and so forth.

Accordingly, similar Consecutive 0 Symbols tables may be associated with each stage in IPv6 trie tree lookup tables 262 and with each stage in IPv4 trie tree lookup tables 261. However, it may desirable to detect consecutive symbols other than consecutive 0 symbols. Thus, each stage of IPv6 trie tree lookup tables 262 and each stage of IPv4 trie tree lookup tables 261 may be associated with tables of consecutive 1 symbols, consecutive 2 symbols, consecutive 3 symbols, and so forth.

By way of example, when 4-bit symbols are used to search lookup tables 260, there are sixteen possible hexadecimal symbols (i.e., 0, 1, 2, . . . , C, D, E, F). Thus, each trie tree stage is associated with 16 consecutive symbols tables. If 5-bit symbols (m=5) are used, each trie tree stage is associated with 32 consecutive symbols tables. If 3-bit symbols (m=3) are used, each trie tree stage is associated with 8 consecutive symbols tables.

Figure 3A:
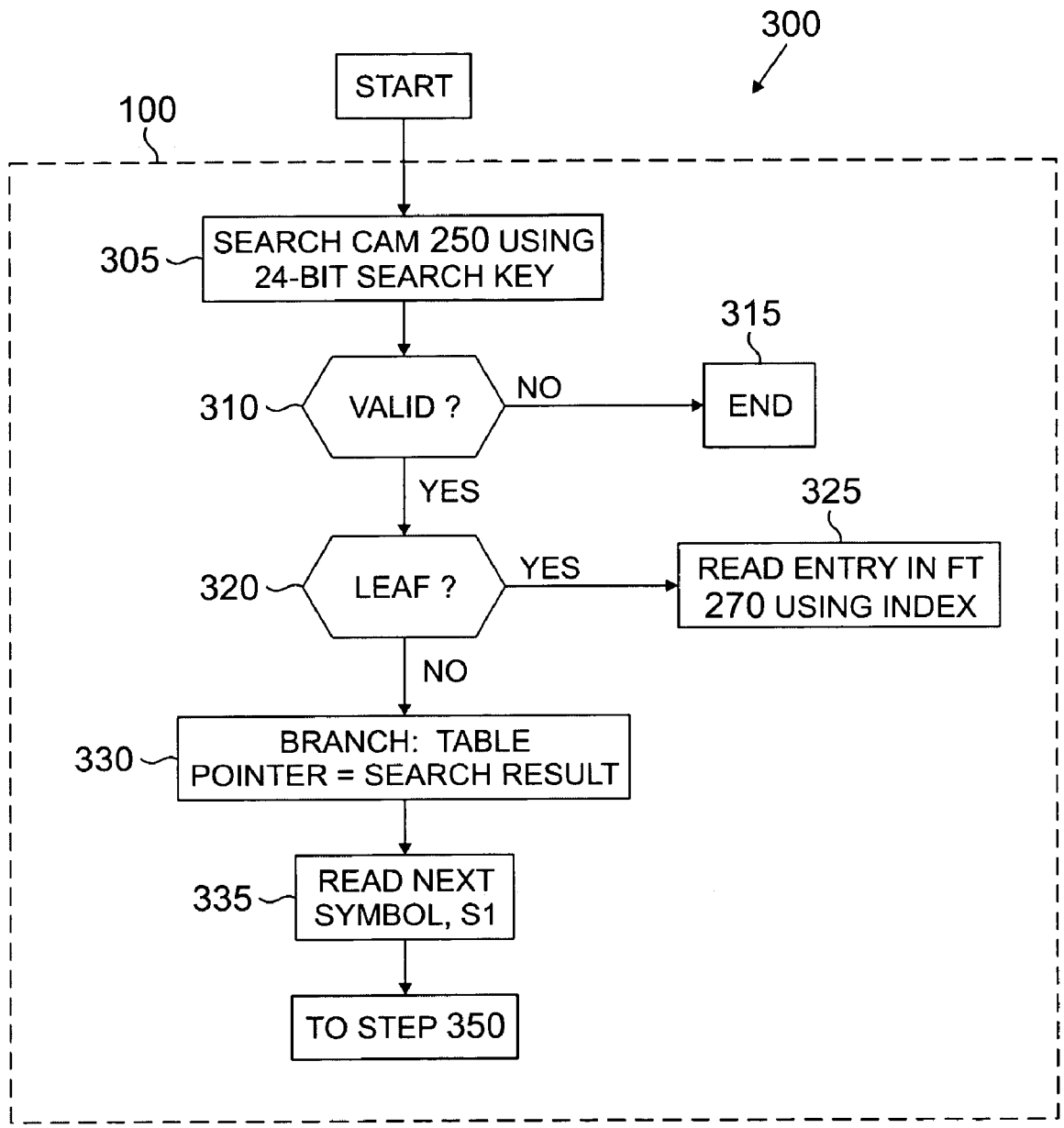
FIG. 3 is a flow diagram illustrating the operation of a routing table search circuit according to the principles of the present invention.
Figure 3B:
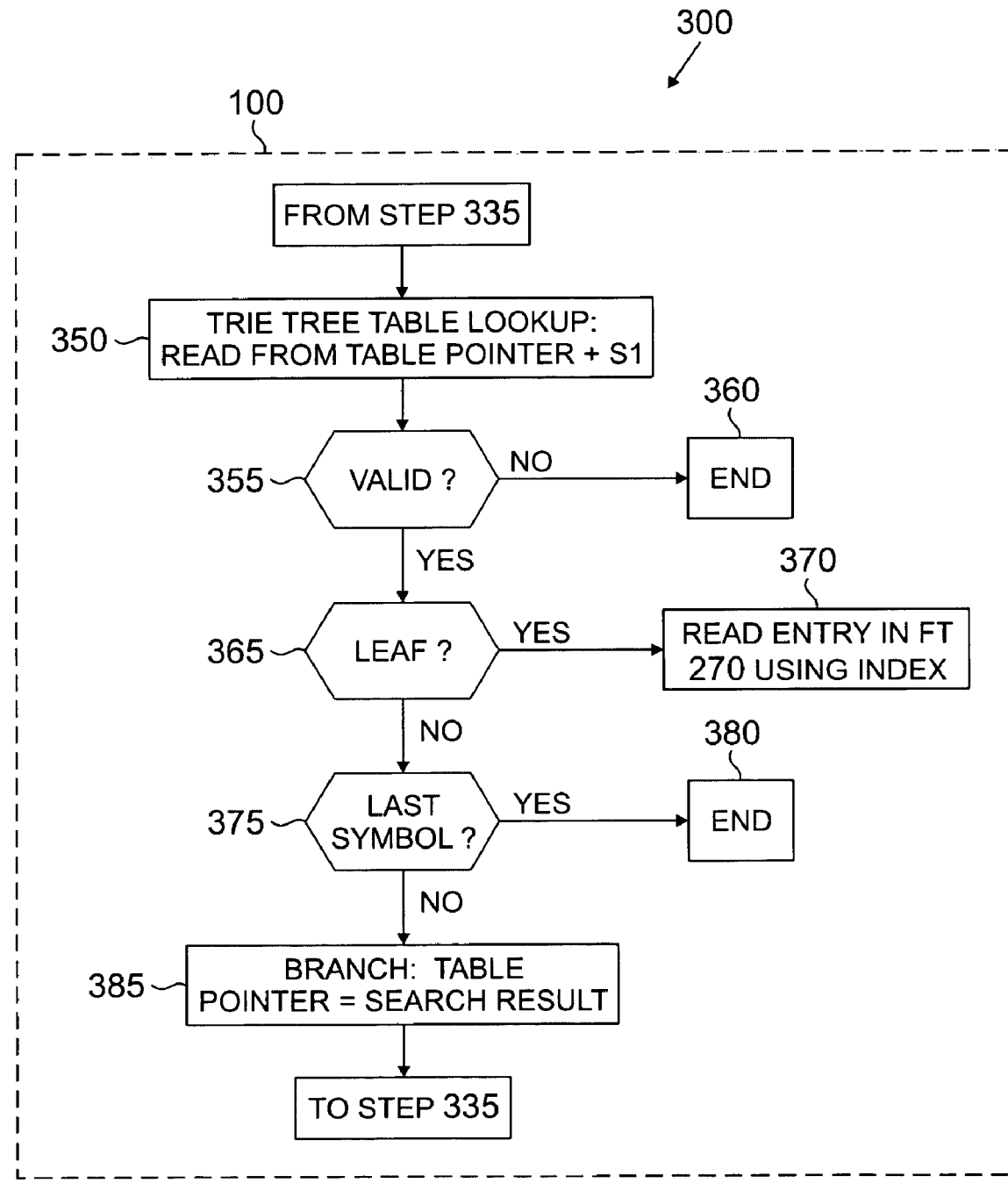

It is not required that consecutive symbols tables be used in lookup tables 260. In FIG. 3, it is assumed that consecutive symbols tables are not implemented.

FIG. 3 depicts flow diagram 300, which illustrates the operation of routing table search circuit 200 according to the principles of the present invention. Initially, the 24-bit search key is used to perform the first stage lookup in CAM 250 (process step 305). For an invalid address, no match is found in CAM 250 and the search ends (process steps 310 and 315).

For a valid MPLS address, or an IPv4 or IPv6 subnet whose length is less than or equal to sixteen, the output of CAM 250 is an address pointer that indexes directly into a table entry in MPLS forwarding table 273, IPv4 forwarding table 271, or IPv6 forwarding table 272 in forwarding tables 270 (process steps 320 and 325). Otherwise, the output of CAM 250 is an address pointer pointing to the first stage (N=1) of trie tree lookup tables 260 (process steps 320 and 330). The width of the CAM result must be at least as wide as the width of the address of the table space and for efficiency typically will be the same as the table address width. Each unique CAM result points to a different tree structure in trie tree lookup tables 260.

The output of CAM 250 and the first 4-bit symbol are added to form an index into the first stage of trie tree lookup tables 260 and the entry is read (process steps 335 and 350). If the entry read in process step 350 is for an invalid address, no match is found in the first stage of trie tree lookup tables 260 and the search ends (process steps 355 and 360). If the entry read in process step 350 is a leaf associated with a valid IPv4 or IPv6 address, then the output of the first stage of trie tree lookup tables 260 is an address pointer that indexes a table entry in either IPv4 forwarding table 271 or IPv6 forwarding table 272 in forwarding tables 270 (process steps 365 and 370).

If the entry read in process step 350 points to a branch in trie tree lookup tables 260, then the output of the first stage of trie tree lookup tables 260 is an address pointer that indexes another lookup table in the second stage of trie tree tables 260. At this point, the search performed in the first stage is repeated in the second stage and each subsequent stage until the last 4-bit symbol of the address is consumed (process steps 375 and 385). If the last symbol is consumed and no leaf has been reached (i.e., no match found) then the search ends (process step 380).

As noted, a search ends when either all symbols are consumed or when a leaf in trie tree lookup tables 260 is reached. The result from the Nth stage of trie tree lookup tables 260 may be a branch or a leaf. A branch leads to another search table in the next stage. A leaf leads to either an address pointer to an entry in forwarding tables 270 or an invalid search result (No Match) indicating that the search string is not known. The subnet mask is used when constructing the tables to define the leaf locations. A status is generated giving the number of nibbles in the longest match.

A flag or a special lookup value (e.g., −1 or 111 . . . 11) may be used to indicate an unknown entry. A flag may be used to indicate whether a table entry is a branch or a leaf. This flag may be incorporated into the normal table entry (e.g., it possible to start all branches on even byte boundaries and all leafs on odd byte boundaries). An alternate embodiment may divide the address space between tree tables and forwarding table entries and use upper address bits to distinguish between them. In another embodiment, flags may be included in each lookup table to indicate whether each lookup entry is a leaf or a branch. An advantageous embodiment of the present invention adds another item to each lookup table that includes one flag for each lookup table entry. The lookup table in each stage of trie tree lookup tables 260 has 16 flags.

In the exemplary embodiment, the address width is 32 bits and nibbles (4 bits) are used for symbols. Thus, the CAM 250 lookup results in a 32-bit address pointer that points to the start of a trie tree in trie tree lookup tables 260 or to an entry in forwarding tables 270. For MPLS data packets, the CAM 250 result points to an entry in forwarding tables 270 or indicates an unknown entry ("No Match"). For IPv4 data packets, there are 16 address bits that are not consumed by CAM 250, so up to another four symbols must be processed in trie tree lookup tables 260. For IPv6 data packets, there are 112 address bits that are not consumed by CAM 250, so up to another 28 symbols must be processed in trie tree lookup tables 260. As explained above, searches for IPv4 and IPv6 data packets terminate: 1) after consumption of all bits; 2) at an early leaf node determined by the subnet mask that contains a forwarding table entry; or 3) when an undefined entry is reached indicating No Match. Since a nibble can have sixteen values, the Nth stage of trie tree lookup tables 260 has 16 entries for each lookup table indexed by an address pointer from the previous stage.

Advantageously, the present invention uses only a small amount of CAM, so that the power consumption and expense are kept within practical limits. Use of CAM 250 for the first stage lookup eliminates the need to pre-initialize the table with invalid search entries and reduces the memory utilization of the first stage lookup. The search table sizes are kept under control and the required lookup speeds are achieved by the combination of hashing, digital search trees, and pipelining.

The unification of the routing of mixed packet types, such as IPv4, IPv6, and MPLS, leads to reduced hardware and memory requirements compared to previous methods that used separate forwarding engines and forwarding processes with independent forwarding tables for each packet type. This method of unification of mixed packet types and CoS based forwarding is scalable to higher data rates than the prior art because it is not limited by the performance and expense of existing classification engines.

As noted above, the description of FIG. 3 above assumed that consecutive symbols tables 264 were not implemented in router 100. However, the description of FIGS. 4 and 5 below assumes that consecutive symbols tables 264 are implemented.

Figure 4:
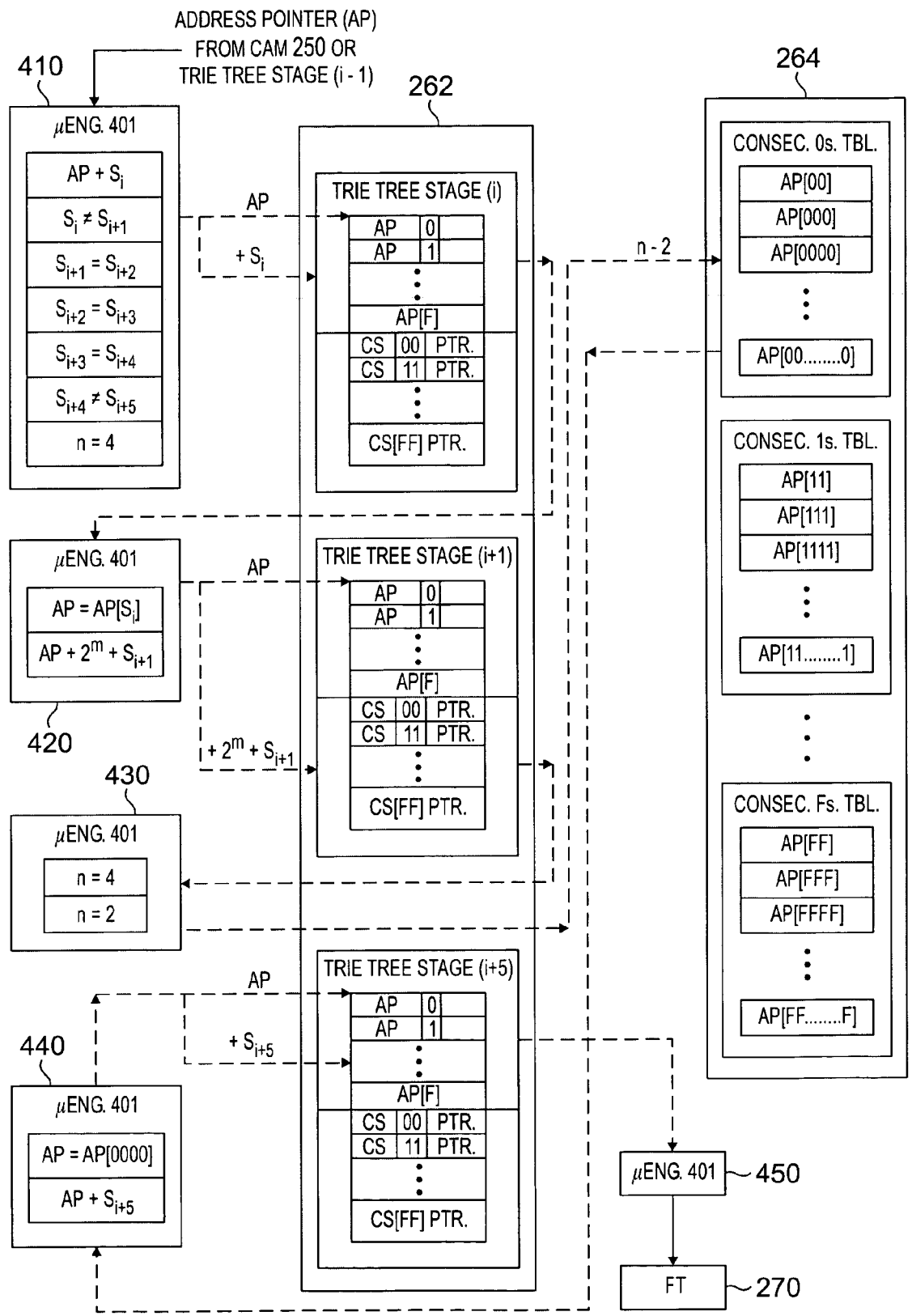
FIG. 4 illustrates selected portions of a routing table search circuit, including consecutive symbols tables, in greater detail according to an exemplary embodiment of the present invention.

FIG. 4 illustrates selected portions of routing table search circuit 200, including consecutive symbols tables 264, in greater detail according to an exemplary embodiment of the present invention. In FIG. 4, microengine 401 in a route processing module (RPM) of router 100 examines M-bit symbols in an address. In the illustrated example, it shall be assumed that an IPv6 address is being looked up. It shall also be assumed that a 4-bit symbol size is being used. However, those skilled in the art will recognize that this is by way of example only and that other address types and other symbol sizes may be used.

It also shall be assumed that each stage of IPv6 trie tree lookup tables 262 is associated with dedicated consecutive symbols tables 264. Consecutive symbols tables 264 may comprise a consecutive symbol lookup table for each possible symbol value. To reduce memory utilization, only the consecutive symbols tables required by known routes are constructed and the pointers to consecutive symbols tables not constructed are set to invalid routes. Thus, in the exemplary embodiment in which 4-bit symbols are used, consecutive symbols tables 264 comprise up to sixteen (16) separate consecutive symbols tables.

Logical blocks 410, 420, 430, 440 and 450 represent operations performed by microengine 401. In Logical block 410, microengine 401 receives either an address pointer (AP) from CAM 250 or receives an address pointer (AP) from the Trie Tree Stage (i−1) of IPv6 trie tree lookup tables 262. Microengine 401 prefetches and examines the address bits (i.e., 4-bit symbols) for the Trie Tree Stage (i), Trie Tree Stage (i+1), Trie Tree Stage (i+2), Trie Tree Stage (i+3), and so forth. It is not necessary for microengine 401 to retain the values of more than two symbols at one time, although many symbols may be used in the search, since no process step requires more than two distinct symbol values. Counts of runs of identical symbols are made and only the symbol value and count are needed for the lookup. Microengine 401 compares the 4-bits symbols (S) and makes the following determinations:

1) The symbol $S_i$ for Trie Tree Stage (i) does not equal the symbol $S_{i-1}$ for the previous Trie Tree Stage (i−1). Alternatively, microengine 401 determines that the received AP is from CAM 250 and that this is Trie Tree Stage 1 (i.e., no previous trie tree stage).

2) The symbol $S_i$ for Trie Tree Stage (i) does not equal the symbol $S_{i+1}$ for the next Trie Tree Stage (i+1).

3) Since symbol $S_i$ for Trie Tree Stage (i) is not the start of a consecutive symbol string, consecutive symbols tables 264 will be ignored and IPv6 trie tree lookup tables 262 will be searched.

4) Symbols $S_{i+1}$, $S_{i+2}$, $S_{i+3}$, and $S_{i+4}$ are the same. Symbol $S_{i+5}$ is different. Thus, a string of four consecutive identical symbols (n=4) has been encountered, starting with symbol $S_{i+1}$ and Trie Tree Stage (i+1).

The address pointer AP from CAM 250, or Trie Tree Stage (i−1), points to the top of the lookup table in Trie Tree Stage (i). Microengine 401 adds the value of symbol $S_i$ to the address pointer AP (i.e., AP+$S_i$) to index into the first $2^m$=16 entries in the top half of Trie Tree Stage (i). The consecutive symbols tables pointers in the 16 entries in the bottom half of Trie Tree Stage (i) are ignored.

In Logical block 420, microengine 401 retrieves from Trie Tree Stage (i) the address pointer, $AP[S_i]$, indexed by symbol $S_i$. However, since symbol $S_{i+1}$ is the start of a sequence of consecutive symbols, microengine 401 indexes into the bottom half of Trie Tree Stage (i+1). To accomplish this, microengine 401 sets $AP=AP[S_i]$. Next, microengine 401 adds $2^m$ and the value of symbol $S_{i+1}$ to AP (i.e., $AP+2^m+S_{i+1}$). For example, if m=4 and the repeating symbols $S_{i+1}$, $S_{i+2}$, $S_{i+3}$, and $S_{i+4}$ are each equal to [0000], then the value $[AP+2^4+S_{i+1}]$ is equal to [AP+16+0000]. Since the value AP points to the top of Trie Tree Stage (i+1), the value [AP+16] points to the first entry in the bottom half of Trie Tree Stage (i+1), namely the Consecutive 0 Symbols pointer (i.e., CS[00] Pointer).

The Consecutive 0 Symbols pointer, CS[00] Pointer, is an address pointer that points to the top of the Consecutive 0s Table corresponding to Trie Tree Stage (i+1) in consecutive symbols tables 264. In Logical block 430, microengine 401 reads the value of CS[00] Pointer. Since the number of repeating symbols is 4 (i.e., n=4), microengine 401 subtracts 2 from the value of n (i.e., n=n−2) and adds n to the value of CS[00] Pointer. Subtracting 2 implicitly acknowledges that there are no strings of 0 or 1 consecutive symbols—the shortest possible sequence is two consecutive symbols.

Thus, the first entry (address 0) in the Consecutive 0s Table is an address pointer (AP) that corresponds to 2 consecutive 0 symbols (i.e., AP[00]). The second entry (address 1) in the Consecutive 0s Table is an address pointer (AP) that corresponds to 3 consecutive 0 symbols (i.e., AP[000]). The third entry (address 2) in the Consecutive 0s Table is an address pointer (AP) that corresponds to 4 consecutive 0 symbols (i.e., AP[000]). The last entry (address R−1) in the Consecutive 0s Table is an address pointer (AP) that corresponds to R consecutive 0 symbols (i.e., AP[00 . . . 0]), where R is the maximum number of consecutive symbols that may be compressed in consecutive symbols tables 264.

In Logical block 440, microengine 401 retrieves the address pointer AP[0000] from the Consecutive 0s Table for Trie Tree Stage (i+1) in consecutive symbols tables 264. It should be noted that address pointer AP[0000] may point to an entry in forwarding tables 270 (i.e., a leaf) or may point to another Trie Tree Stage in IPv6 trie tree lookup tables 262 (i.e., a branch). In the illustrated example, address pointer AP[0000] points to the top of Trie Tree Stage (i+5) in lookup tables 262. Thus, three Trie Tree Stages corresponding to the consecutive symbols are skipped.

Next, microengine 401 sets AP=AP[0000] and adds the next non-consecutive symbol, $S_{i+5}$, to AP (i.e., $AP=AP+S_{i+5}$). In Logical block 450, microengine 401 retrieves the search result (i.e., address pointer) from Trie Tree Stage (i+5). In the illustrated example, a leaf is reached and the search result is an address pointer pointing to an entry in forwarding table (FT) 270.

Figure 5A:
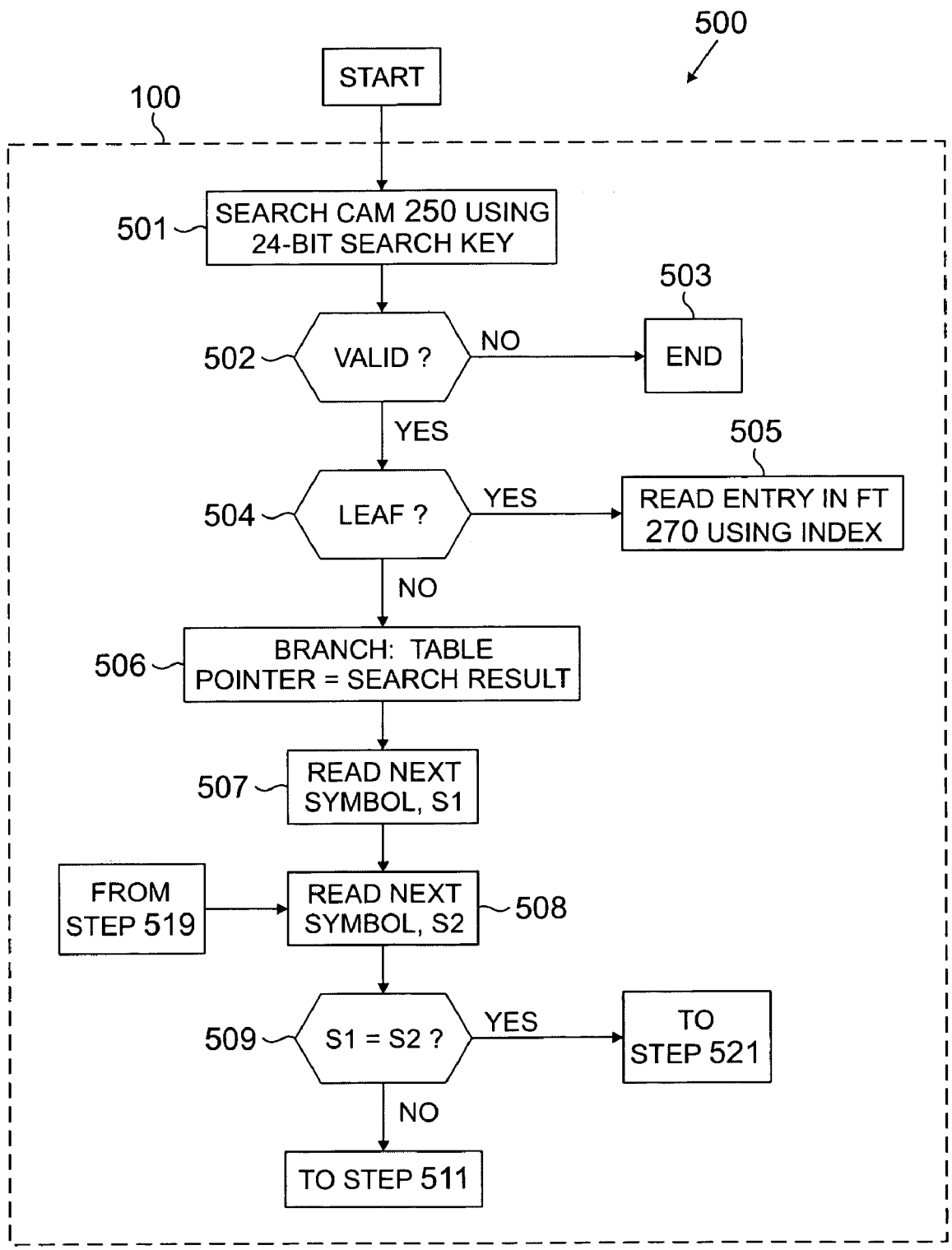
FIG. 5 is a flow diagram illustrating the operation of a routing table search circuit, including consecutive symbols tables, according to the principles of the present invention.
Figure 5B:
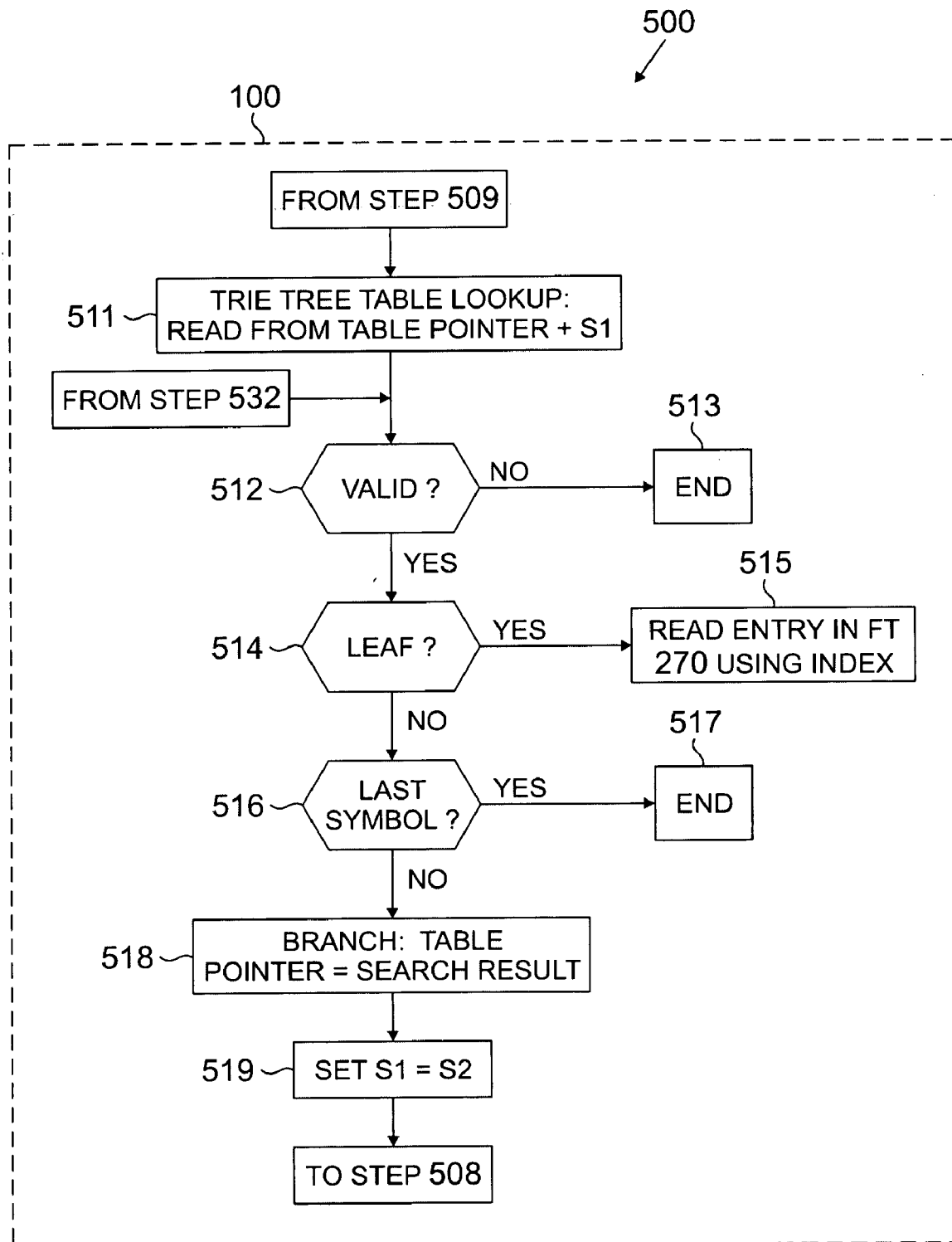
Figure 5C:
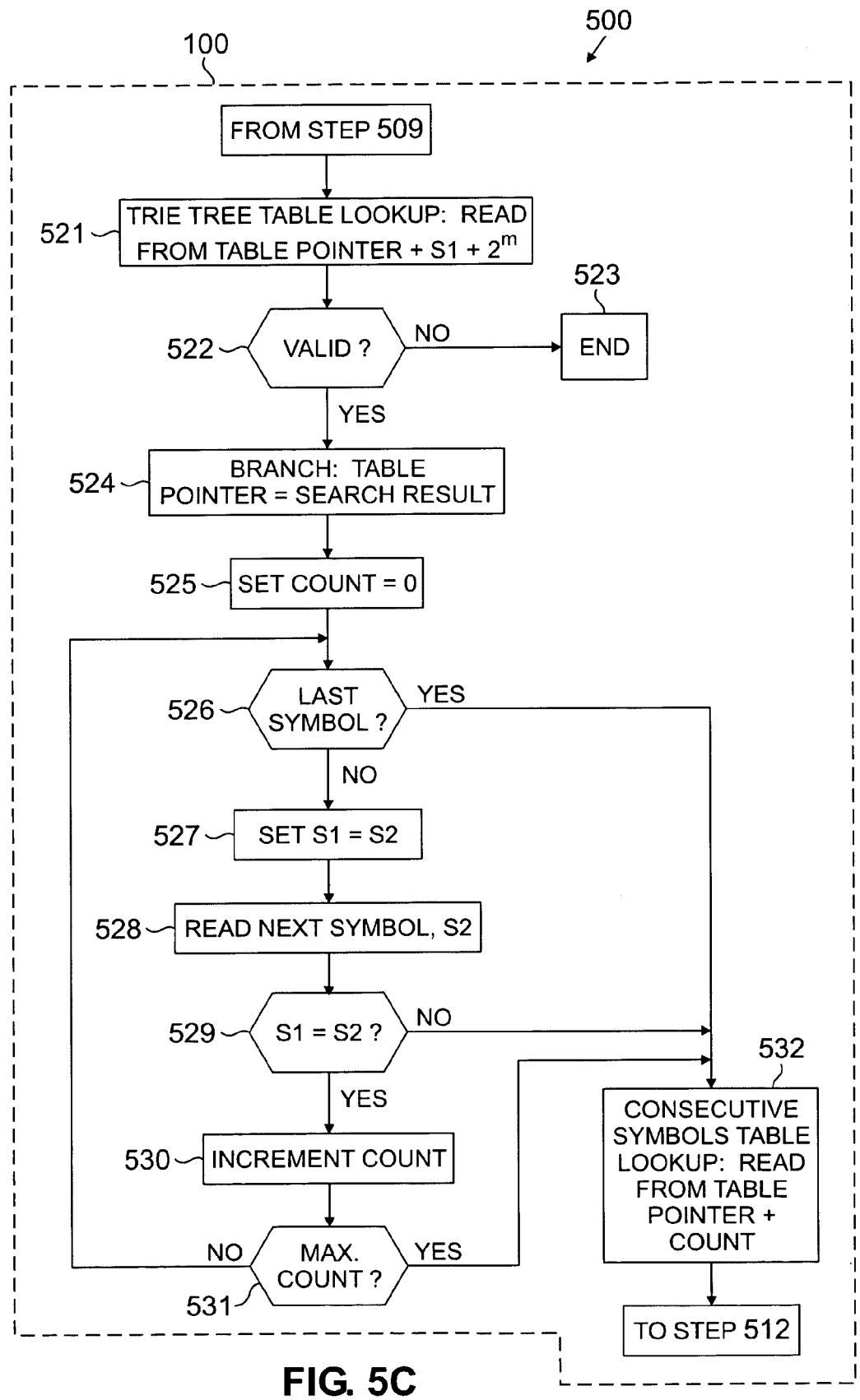

FIG. 5 depicts flow diagram 500, which illustrates the operation of routing table search circuit 200, including consecutive symbols tables 264, according to the principles of the present invention. Initially, the 24-bit search key is used to perform the first stage lookup in CAM 250 (process step 501). For an invalid address, no match is found in CAM 250 and the search ends (process steps 502 and 503).

For a valid MPLS address, or an IPv4 or IPv6 subnet whose length is less than or equal to sixteen, the output of CAM 250 is an address pointer that indexes directly into a table entry in MPLS forwarding table 273, IPv4 forwarding table 271, or IPv6 forwarding table 272 in forwarding tables 270 (process steps 504 and 505). Otherwise, the output (search result) of CAM 250 is an address pointer pointing to the first stage (i=1) of trie tree lookup tables 260 (process steps 504 and 506). The width of the CAM result must be at least as wide as the width of the address of the table space and for efficiency typically will be the same as the table address width. Each unique CAM result points to a different tree structure in trie tree lookup tables 260.

The next two symbols, S1 and S2, are read (process steps 507 and 508). Routing table search circuit 200 then determines if S1 and S2 are the same to see if consecutive identical symbols have occurred (process step 509). If the symbols are not the same, the output of CAM 250 and the first 4-bit symbol, S1, are added to form an index into the first stage of trie tree lookup tables 260 and the entry is read (process step 511). If the entry read in process step 511 is for an invalid address, no match is found in the first stage of trie tree lookup tables 260 and the search ends (process steps 512 and 513). If the entry read in process step 511 is a leaf associated with a valid IPv4 or IPv6 address, then the output of the first stage of trie tree lookup tables 260 is an address pointer that indexes a table entry in either IPv4 forwarding table 271 or IPv6 forwarding table 272 in forwarding tables 270 (process steps 514 and 515).

If the entry read in process step 511 points to a branch in trie tree lookup tables 260, then the output of the first stage of trie tree lookup tables 260 is an address pointer that indexes another lookup table in the second stage of trie tree tables 260. At this point, the search performed in the first stage is repeated in the second stage and each subsequent stage until the last 4-bit symbol of the address is consumed (process steps 516 and 518). For the purpose of detecting repeating consecutive symbols, the second symbol S2 is now treated as the new first symbol (process step 519). If the last symbol is consumed and no leaf has been reached (i.e., no match found) then the search ends (process step 517).

If in process step 509, routing table search circuit 200 determined that the first two symbols S1 and S2 were the same, then the output of CAM 250, the first 4-bit symbol, S1, and the value $2^m$ are added to form an index into the bottom half of trie tree lookup tables 260 and the entry is read (process step 521). If the entry in the bottom half of the trie tree lookup stage is not valid, then there are no routes traversing this path and the search ends (process steps 522 and 523). If the entry in the bottom half of the trie tree lookup stage is valid, the entry is an address pointer pointing to a valid consecutive symbols table associated with the value of S1 and S2 (process step 524).

At this point, routing table search circuit 200 determines how many consecutive symbols (in addition to S1 and S2) are in the sequence. A counter is initialized to 0 (process step 526). If the end of an IPv4 or IPv6 address is reached, then the last symbol has been reached and the routing table search circuit 200 adds the value of the counter (i.e., 0 on the first pass) to the address pointer retrieved from the bottom half of the trie tree lookup stage and reads the search result from the selected consecutive symbols table for S1 and S2 (process steps 526 and 532). The operation then returns to process step 512 to evaluate the search result.

If the next symbol (S3) is the same as S1 and S2, routing table search circuit 200 continues to compare successive symbols until either a last identical symbol is detected or the number of identical consecutive symbols equals a Maximum Count threshold value (process steps 526, 527, 528, 529, 530 and 531). Each pass through process steps 526-531 increments the value of Count. When a non-identical symbol is finally reached, routing table search circuit 200 adds the value of Count to the address pointer retrieved from the bottom half of the trie tree lookup stage and reads the search result from the selected consecutive symbols table (process steps 529 and 532).

The embodiment of the invention illustrated and explained in FIG. 4 is able to detect consecutive strings of more than one type of symbol. Hence, consecutive symbols tables 264 comprises consecutive symbols tables for consecutive 0s, consecutive 1s, consecutive 2s, and so forth, up to consecutive Fs. Because of this, the bottom half of each trie tree stage is used as an intermediate table that stores address pointers that point to the correct consecutive symbols table. The value of the repeating symbol is used to select the correct consecutive symbols table.

However, the structure in FIG. 4 may be simplified if it is desired to detect only one type of repeating symbol. For example, it may be desired to detect only strings of consecutive zeros in IPv4 or IPv6 addresses. Since only one type of repeating symbol is being detected, consecutive symbols tables 264 actually comprise only Consecutive 0 Symbols tables. Instead of being implemented in a logically separate consecutive symbols tables 264, the Consecutive 0 Symbols tables may be integrated into IPv4 trie tree lookup tables 261 and IPv6 trie tree lookup tables 262 by storing the address pointers AP[00], AP[000], AP[0000], . . . , AP[00 . . . 0], in the bottom halves of the trie tree stages.

In such an embodiment, when microengine 401 determines that S1 and S1 are both [0000], microengine 401 indexes into the bottom half of the trie tree stage by calculating the address value $AP+2^m+n-2$, where AP is the address pointer from the previous stage, m is the symbol size (i.e., m=4 in this example), and n is the number of consecutive 0 symbols, thus saving the intermediate table lookup.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a router, a routing table search circuit for determining a first destination address for a first received data packet comprising:
a forwarding table comprising a plurality of forwarding table entries, each of said forwarding table entries comprising a destination address;
a trie tree search table for translating a portion of an address associated with said first received data packet into a destination pointer for accessing said first destination address in said forwarding table, wherein a first stage of said trie tree search table is searched using a received address pointer retrieved from a previous stage of said trie tree search table and a first m-bit symbol comprising in bits of said portion;
at least one consecutive identical symbols table associated with said first stage of said trie tree search table; and
a control circuit capable of determining that a second m-bit symbol immediately following said first m-bit symbol is the same as said first m-bit symbol, wherein said control circuit, in response to said determination, determines a total number of consecutive identical m-bit symbols beginning with said first m-bit symbol.

2. The routing table search circuit as set forth in claim 1 wherein said control circuit retrieves from said at least one consecutive identical symbols table a first address pointer determined by said total number of consecutive identical m-bit symbols.

3. The routing table search circuit as set forth in claim 2 wherein said first address pointer comprises said destination pointer.

4. The routing table search circuit as set forth in claim 2 wherein said first address pointer is used to search a subsequent stage of said trie tree search table.

5. The routing table search circuit as set forth in claim 2 wherein said at least one consecutive identical symbols table comprises a plurality of consecutive identical symbols tables and said control circuit uses a value of said first m-bit symbol to select a first one of said plurality of consecutive identical symbols tables.

6. The routing table search circuit as set forth in claim 5 further comprising an intermediate table for storing a plurality of consecutive identical symbols tables pointers, each of said consecutive identical symbols tables pointers associated with one of said plurality of consecutive identical symbols tables.

7. The routing table search circuit as set forth in claim 6 wherein said control circuit uses said value of said first m-bit symbol to retrieve a first one of said consecutive identical symbols tables pointers from said intermediate table.

8. The routing table search circuit as set forth in claim 7 wherein said control circuit uses said retrieved first identical consecutive symbols tables pointer to select said first consecutive identical symbols table.

9. The routing table search circuit as set forth in claim 8 wherein said first address pointer comprises said destination pointer.

10. The routing table search circuit as set forth in claim 8 wherein said first address pointer is used to search a subsequent stage of said trie tree search table.

11. A router for interconnecting N interfacing peripheral devices, said router comprising:
a switch fabric; and
a plurality of routing nodes coupled to said switch fabric, each of said routing nodes comprising a routing table search circuit for determining a first destination address for a first received data packet, the routing table search circuit comprising:
a forwarding table comprising a plurality of forwarding table entries, each of said forwarding table entries comprising a destination address;
a trie tree search table for translating a portion of an address associated with said first received data packet into a destination pointer for accessing said first destination address in said forwarding table, wherein a first stage of said trie tree search table is searched using a received address pointer retrieved from a previous stage of said trie tree search table and a first m-bit symbol comprising m bits of said portion;
at least one consecutive identical symbols table associated with said first stage of said trie tree search table; and
a control circuit capable of determining that a second m-bit symbol immediately following said first m-bit symbol is the same as said first m-bit symbol, wherein said control circuit, in response to said determination, determines a total number of consecutive identical m-bit symbols beginning with said first m-bit symbol.

12. The router as set forth in claim 11 wherein said control circuit retrieves from said at least one consecutive identical symbols table a first address pointer determined by said total number of consecutive identical m-bit symbols.

13. The router as set forth in claim 12 wherein said first address pointer comprises said destination pointer.

14. The router as set forth in claim 12 wherein said first address pointer is used to search a subsequent stage of said trie tree search table.

15. The router as set forth in claim 12 wherein said at least one consecutive identical symbols table comprises a plurality of consecutive identical symbols tables and said control circuit uses a value of said first m-bit symbol to select a first one of said plurality of consecutive identical symbols tables.

16. The router as set forth in claim 15 further comprising an intermediate table for storing a plurality of consecutive identical symbols tables pointers, each of said consecutive identical symbols tables pointers associated with one of said plurality of consecutive identical symbols tables.

17. The router as set forth in claim 16 wherein said control circuit uses said value of said first m-bit symbol to retrieve a first one of said consecutive identical symbols tables pointers from said intermediate table.

18. The router as set forth in claim 17 wherein said control circuit uses said retrieved first consecutive identical symbols tables pointer to select said first consecutive identical symbols table.

19. The router as set forth in claim 18 wherein said first address pointer comprises said destination pointer.

20. The router as set forth in claim 18 wherein said first address pointer is used to search a subsequent stage of said trie tree search table.

21. For use in router, a method for determining a first destination address for a first received data packet comprising the steps of:

searching a first stage of trie tree search table using a received address pointer retrieved from a previous stage of the trie tree search table and a first m-bit symbol comprising m bits of a portion of an address associated with the first received data packet;

determining that a second m-bit symbol immediately following the first m-bit symbol is the same as the first m-bit symbol;

in response to the determination, determining a total number of consecutive identical m-bit symbols beginning with the first m-bit symbol; and retrieving from a consecutive identical symbols table associated with the first stage of the trie tree search table a first address pointer determined by the total number of consecutive identical m-bit symbols, wherein the first address pointer may be used to access the first destination address in a forwarding table of the router.

22. The method as set forth in claim 21 further comprising the step of accessing the first destination address in the forwarding table using the first address pointer.

23. The method as set forth in claim 21 further comprising the step of searching a subsequent stage of the trie tree search table using the first address pointer.

24. The method as set forth in claim 21 wherein the consecutive identical symbols table comprises a plurality of consecutive identical symbols tables and further comprising the step of selecting a first one of the plurality of consecutive identical symbols tables according to a value of the first m-bit symbol.

* * * * *

UNITED STATES PATENT AND TRADEMARK OFFICE
CERTIFICATE OF CORRECTION

PATENT NO. : 7,564,841 B2  Page 1 of 1
APPLICATION NO. : 10/826158
DATED : July 21, 2009
INVENTOR(S) : Jack W. Wybenga, Patrick W. Ireland and Patricia K. Sturm It is certified that error appears in the above-identified patent and that said Letters Patent is hereby corrected as shown below:

Column 9, line 55, delete "0000" and replace with --[0000]--;

Column 10, line 5, delete "0000" and replace with --[0000]--;

Column 15, claim 1, line 54, delete "in" and replace with --m--.

Signed and Sealed this

Twenty-seventh Day of April, 2010

David J. Kappos
*Director of the United States Patent and Trademark Office*